United States Patent [19]

Serizawa

[11] Patent Number: 5,287,101
[45] Date of Patent: Feb. 15, 1994

[54] VEHICULAR TURN SIGNAL LAMP

[75] Inventor: Yukio Serizawa, Shizuoka, Japan

[73] Assignee: Koito Manufacturing Co. Ltd., Tokyo, Japan

[21] Appl. No.: 993,895

[22] Filed: Dec. 18, 1992

Related U.S. Application Data

[63] Continuation of Ser. No. 656,328, Feb. 19, 1991, abandoned.

[30] Foreign Application Priority Data

Mar. 15, 1990 [JP] Japan .................................. 2-65703

[51] Int. Cl.⁵ .................................................. G08B 5/00
[52] U.S. Cl. .................................. 340/815.76; 362/61; 362/80; 362/331
[58] Field of Search ............... 340/815.15, 479, 475; 362/61, 80, 297, 346, 268, 331

[56] References Cited

U.S. PATENT DOCUMENTS

| 2,629,815 | 2/1953 | Grupen et al. | 362/61 |
| 4,261,029 | 4/1981 | Mousset | 362/346 |
| 4,450,513 | 5/1984 | Guggemos | 362/346 |
| 4,577,260 | 3/1986 | Tysoe | 362/331 |
| 4,800,467 | 1/1989 | Lindae et al. | 362/61 |
| 4,907,134 | 3/1990 | Mori | 362/61 |
| 4,912,606 | 3/1990 | Yamamoto | 362/80 |
| 5,081,561 | 1/1992 | Mizoguchi et al. | 362/61 |

Primary Examiner—Ulysses Weldon
Assistant Examiner—Deon Yue Chow
Attorney, Agent, or Firm—Sughrue, Mion, Zinn, Macpeak & Seas

[57] ABSTRACT

A vehicular turn signal lamp in which part of the direct light from the light bulb is reflected from the reflector of an inner cap and applied through the rear lens portion of an outer lens. Hence, an observer at the rear of (or in front of) the vehicle body can observe the lamp more positively, and the lamp gives a positive signal to the observer that the vehicle will turn. The turn signal lamp includes a lamp body having a reflecting mirror surface formed on at least a portion of an inner surface thereof, a light bulb mounted in a rear opening in the lamp body, an inner cap covering the light bulb, a reflector protruding from an outer surface of the inner cap for reflecting light from the light bulb rearwardly, and an outer lens engaged with a front opening of the lamp body and having a rear lens portion through which light reflected from the reflector passes. The rear lens portion extends beyond a side panel of the vehicle when the lamp is installed on the vehicle.

14 Claims, 3 Drawing Sheets

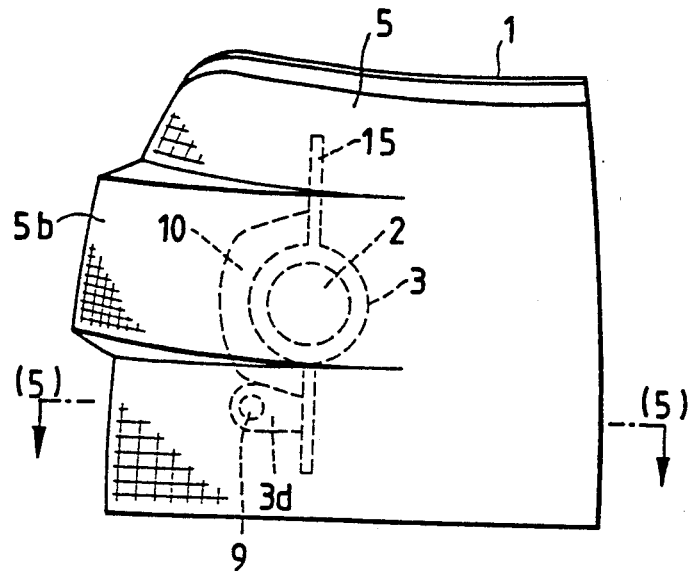
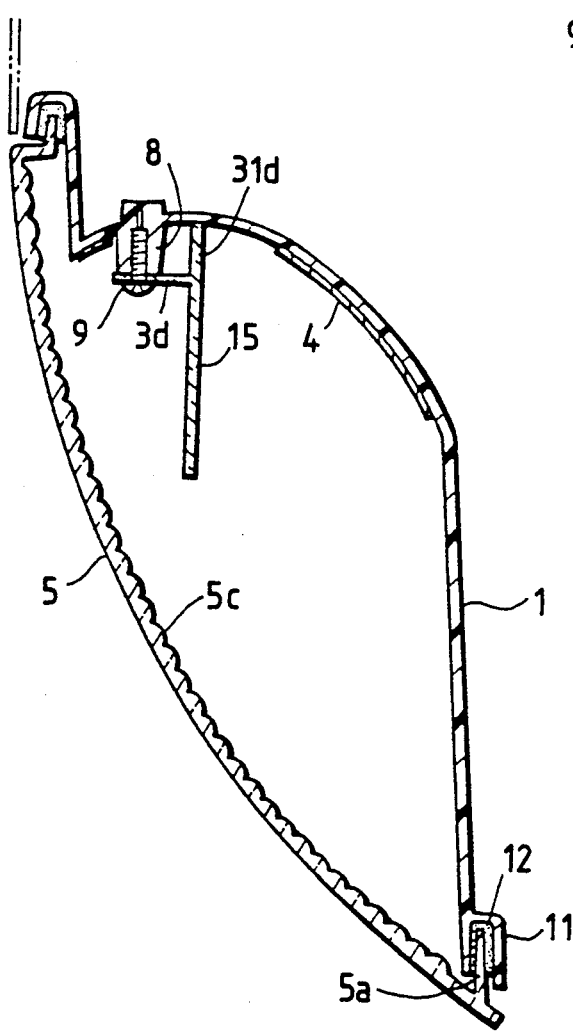
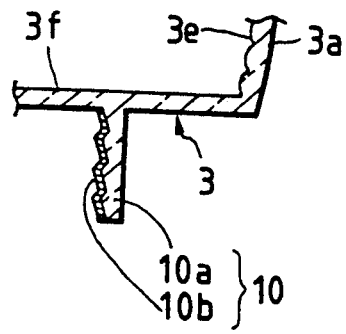

VEHICULAR TURN SIGNAL LAMP

This is a continuation of application Ser. No. 07/656,328 filed Feb. 19, 1991.

BACKGROUND OF THE INVENTION

The present invention relates to a turn signal lamp for automotive vehicles.

Recently, vehicular front (or rear) turn signal lamps have been designed to extend from the front (or rear) of the vehicle body to the side. With such a construction, the lamp can provide a signal both forward of (or behind) and laterally of the vehicle body when the vehicle is to turn right or left. However, it is rather difficult for an observer located behind (in front of) the vehicle body to see the front (rear) turn signal lamp, and therefore it is impossible for the lamp to positively give a signal in all directions indicating that the vehicle intends to turn.

SUMMARY OF THE INVENTION

Accordingly, an object of the invention is to eliminate the above-described difficulty accompanying a conventional turn signal lamp. More specifically, an object of the invention is to provide a vehicular turn signal lamp which can positively indicate to an observer located behind (or in front of) the vehicle body that the vehicle will turn.

The foregoing object and other objects of the invention have been achieved by the provision of a vehicular turn signal lamp in which, according to the invention, a light bulb mounted in a lamp body having a front opening is covered with an inner cap, a reflector protrudes from the outer surface of the inner cap to reflect a part of the light of the light bulb rearwardly, and an outer lens engaged with the front opening of the lamp body has a rear lens portion through which light reflected from the reflector passes, wherein the rear lens portion extends beyond the side panel of the vehicle.

BRIEF DESCRIPTION OF THE DRAWINGS

FIG. 3 is a front view of the vehicular turn signal lamp of FIG. 1;

FIG. 4 is a sectional view showing a modification of a reflector formed on an inner cap in the vehicular turn signal lamp of the invention;

FIG. 5 is a sectional view taken along a line (5)—(5) in FIG. 3; and

DESCRIPTION OF THE PREFERRED EMBODIMENTS

Figure 1:
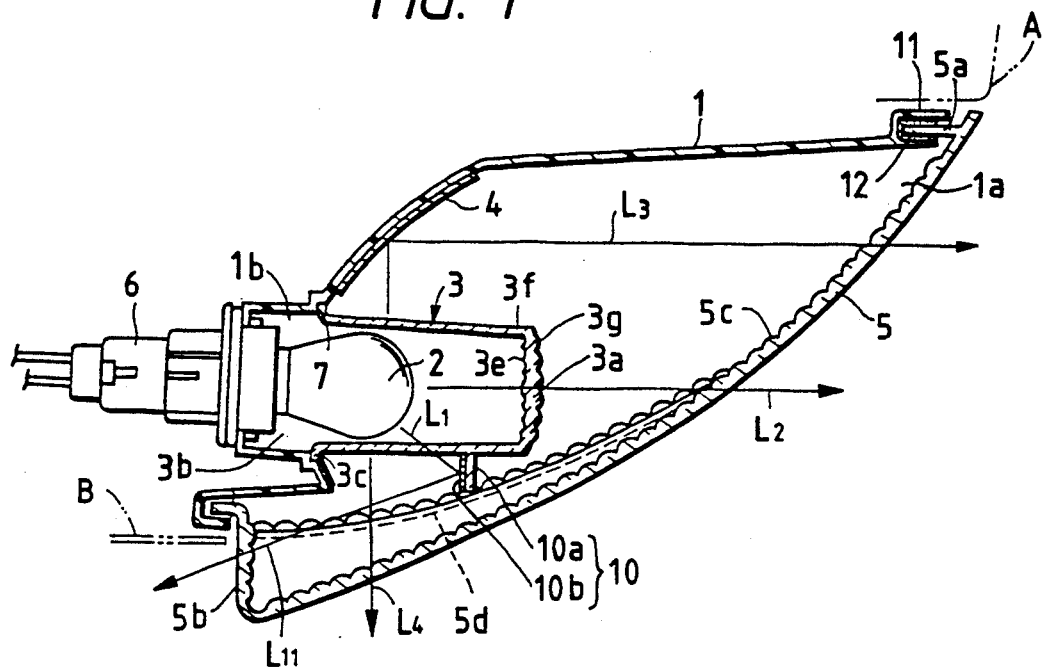
FIG. 1 is a sectional view taken along a line (1)—(1) in FIG. 2 showing a preferred embodiment of a vehicular turn signal lamp constructed according to the invention.
Figure 2:
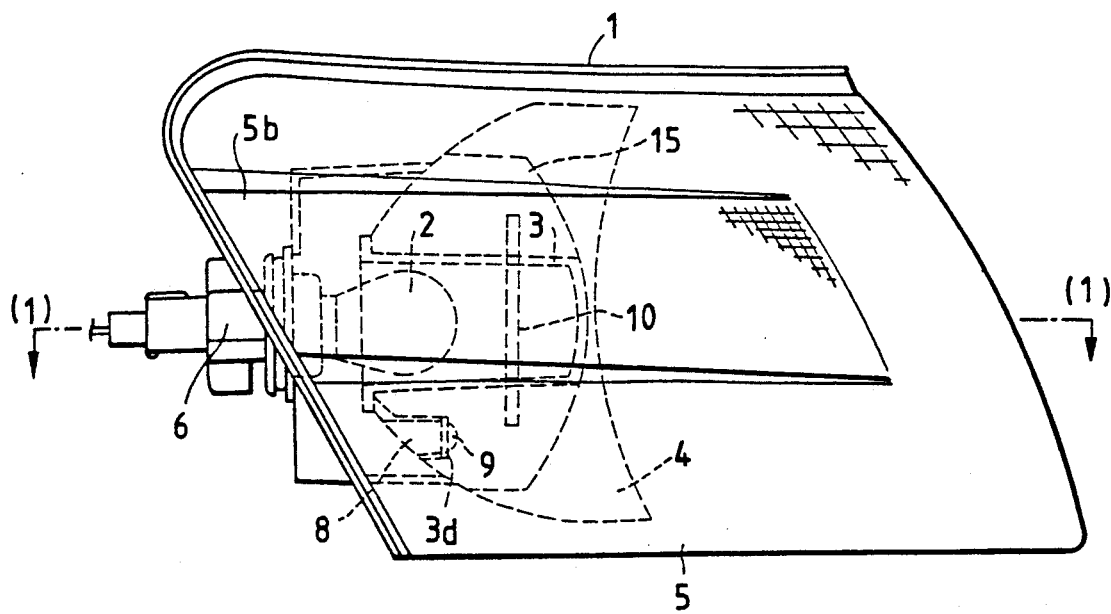
FIG. 2 is a side view showing the vehicular turn signal lamp of FIG. 1.
Figure 6:
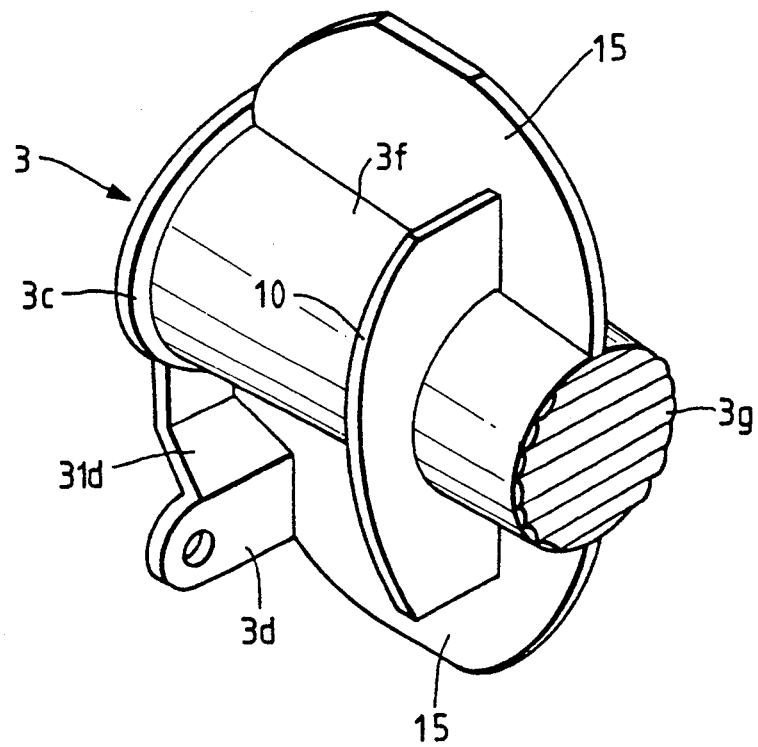
FIG. 6 is a perspective view of the inner cap.

A preferred embodiment of a vehicular turn signal lamp according to the invention will be described with reference to the accompanying drawings.

The example shown in the drawings is a front turn signal lamp which, similar to the above-described conventional turn signal lamp, extends from the front of the vehicle body to the side, and is disposed adjacent to, for instance, a head lamp A so as to provide a signal to an observer located in front of or laterally of the vehicle body indicating that the vehicle will turn right or left. In the drawings, reference character B designates a side panel of the vehicle body.

A lamp body 1 is formed so that, when it is installed on the vehicle body, its front opening 1a extends from the front of the vehicle body to the side. A light bulb 2 and an inner cap 3 are provided inside the lamp body 1. The inner wall of the lamp body 1 is formed with a reflecting mirror 4 by vacuum-depositing aluminum or otherwise forming an aluminum layer thereon. An outer lens 5 is fitted over the front opening 1a. The lamp body 1 has a rear opening 1b in which a bulb socket 6 is detachably fitted.

The bulb 2 is engaged with the bulb socket 6 in such a manner that it can be replaced when necessary, and it is positioned at the focal point of the reflector 4. The inner cap 3 is set outside the light bulb 2 in such a manner as to substantially cover the light bulb 2.

The inner cap 3 is substantially in the form of a cup made of transparent resin material; that is, the inner cap 3 has a front wall 3a (corresponding to the bottom of the cup), a flange 3c around its opening 3b, and a mounting leg 3d extending outwardly from the flange 3c. The inner cap 3 is coupled to the lamp body 1 as follows: The opening 3b of the inner cap 3 is confronted with the rear opening 1b of the lamp body 1 so that the bulb 2 may be inserted into the inner cap 3 through the opening 3b, and the opening flange 3c is abutted against a supporting step 7 formed in the inside of the rear opening 1b of the lamp body 1. Under this condition, with the front end portion 31d of the mounting leg 3d abutted against the inner surface of the lamp body 1, the mounting leg 3d is secured to a mounting boss 8 extending from the lamp body 1 by a screw 9.

If desired, the inner cap 3 may be amber colored, and its inner surface and/or outer surface may be formed with lens steps so as to obtain a predetermined light distribution characteristic, thus functioning as an inner lens. In the preferred embodiment, the inner cap 3 is amber in color, and Fresnel lens steps 3e are formed on the inner surface of the front wall 3a to convert an output light beam $L_2$ of the light bulb 2 into a parallel light beam, while laterally extended cylindrical lens steps 3g are formed on the outer surface of the front wall 3a to diffuse the parallel light beam vertically. Thus, the inner cap 3 serves as an inner lens.

A reflector 10 extends outwardly from the cylindrical wall 3f of the inner cap 3 so as to reflect a part $L_2$ of the output light of the light bulb 2 rearwardly of the vehicle body. In addition, light emission panels 15 extend outwardly from the cylindrical wall 3f of the inner cap 3.

The reflector 10 is composed of a reflecting panel 10a which is substantially in the form of a sector extending outwardly from the cylindrical wall 3f of the inner cap 3, and a reflecting surface 10b formed on the reflecting panel by vacuum depositing aluminum or otherwise forming an aluminum layer thereon, whereby part $L_2$ of the output light of the light bulb 2 is reflected rearwardly of the vehicle body a described above. The reflecting surface 10b of the reflector 10 may be flat as shown in FIG. 1, or it may be formed into a diffusing reflecting surface or directional reflecting surface, namely, a wavy surface as shown in FIG. 4.

The light emission panels 15 are provided to make the light emission area of the lamp larger when the lamp is observed from the side of the vehicle body. Hence, the light emission panels 15 are made to protrude vertically from the cylindrical wall 3f of the inner cap 3 and to extend between the flange 3c and the front wall 3a (the bottom of the cup) in such a manner that they are parallel to the side of the vehicle body when installed.

An outer lens 5 is curved in conformance with the configuration of the front opening 1a of the lamp body 1; that is, it extends from the front of the vehicle body to the side. A sealing leg 5a is formed on the inner surface of the peripheral portion of the outer lens 5. The sealing leg 5a thus formed is engaged in a gas-tight manner through a sealing agent 12 in a sealing groove formed along the front opening 1a of the lamp body 1. The outer lens 5 includes a rear lens portion 5b to transmit the light $L_{11}$ reflected from the reflector 10 of the inner cap 3 rearwardly of the vehicle body. The rear lens portion 5b is formed by extending the side lens portion 5d of the outer lens 5 outwardly so that it extends beyond the side panel B of the vehicle body when the lamp is installed. The outer lens 5 may be clear, or it may be colored amber as the case may be. In addition, lens steps for obtaining a predetermined light distribution characteristic may be formed on the whole inner surface of the outer lens 5 including the inner surface of the rear lens portion 5b. In the embodiment herein under consideration, the outer lens 5 is clear (white), and lens steps 5c for obtaining a predetermined light distribution characteristic are formed on the whole inner surface including the inner surface of the rear lens portion 5b.

A front turn signal lamp has been described which produces a light distribution pattern which extends from the front of the vehicle body to the side. However, the invention is equally applicable to a rear turn signal lamp which extends from the rear of the vehicle body to the side. In the case of a rear turn signal lamp, the direct light $L_2$ and the reflected light $L_3$ advance rearwardly of the vehicle body, the direct light $L_4$ passing through the cylindrical wall 3f of the inner cap 3 advances laterally of the vehicle body, and the light $L_{11}$ reflected from the reflector 10 of the inner cap 3 advances forwardly of the vehicle body so that it is applied through the rear lens portion 5b of the outer lens forwardly of the vehicle body.

In the vehicular turn signal lamp thus constructed according to the invention, part of the direct light from the light bulb, being reflected from the reflector of the inner cap, is applied through the rear lens portion of the outer lens. Hence, in the case where the lamp is installed on the front (or the rear) of the vehicle, an observer at the rear of (or in front of) the vehicle body can observe the lamp more positively, and the lamp gives a positive signal to the observer that the vehicle will turn.

In order to distribute the light of the light bulb rearwardly (or forwardly) of the vehicle body, a reflector is formed on the inner cap according to the invention. That is, the light of the light can be readily distributed rearwardly (or forwardly) of the vehicle body without formation of special lens steps on the outer lens. This contributes to a reduction of the manufacturing cost of the lens.

What is claimed is:

1. A turn signal lamp for a vehicle, comprising:

a lamp body having a reflecting mirror surface formed on an inner surface thereof;

a light bulb mounted in a rear opening in said lamp body;

a translucent inner cap disposed around and cover said light bulb;

a reflector protruding from an outer side surface of said inner cap laterally and forwardly of said light bulb for reflecting light from said light bulb transmitted through said side surface of said inner cap such that said light is reflected rearwardly of said turn signal lamp;

an outer lens engaged with a front opening of said lamp body and having a rear lens portion through which light reflected from said reflector passes without being reflected by said reflecting mirror surface, said rear lens portion extending outwardly beyond an adjacent side panel of said vehicle when said turn signal lamp is installed on said vehicle.

2. The turn signal lamp of claim 1, wherein a central body portion of said inner cap is in the form of a cup made of a synthetic resin having a cylindrical wall and a front wall having lensing formed therein.

3. The turn signal lamp of claim 2, wherein said front wall of said inner cap has Fresnel lens steps formed on an inner surface thereof and cylindrical lens steps formed on an outer surface thereof.

4. The turn signal lamp of claim 3, wherein said cylindrical lens steps extend in a lateral direction.

5. The turn signal lamp of claim 2, wherein said inner cap further comprises light emission panels protruding vertically from said cylindrical wall of said inner cap and extending parallel with a side of said vehicle.

6. The turn signal lamp of claim 2, wherein said reflector comprises a sector-shaped panel extending outwardly from said cylindrical wall of said inner cap and a reflecting surface formed on said sector-shaped panel.

7. The turn signal lamp of claim 6, wherein said reflecting surface is formed of vacuum-deposited aluminum.

8. The turn signal lamp of claim 6, wherein said reflecting surface is formed of an aluminum layer.

9. The turn signal lamp of claim 6, wherein said reflecting surface is flat.

10. The turn signal lamp of claim 6, wherein said reflecting surface is a diffusing reflecting surface.

11. The turn signal lamp of claim 6, wherein said reflecting surface is wavy.

12. The turn signal lamp of claim 2, wherein said inner cap further comprises a flange around a rear end of said cylindrical wall, said flange being fitted in a supporting step formed in an inside of said rear opening of said lamp body.

13. The turn signal lamp of claim 2, wherein said inner cap further comprises a mounting leg secured to a boss of said lamp body.

14. The turn signal lamp of claim 1, wherein said outer lens has lens steps formed in an inner surface thereof, including an inner surface of said rear lens portion.

* * * * *